(12) United States Patent
Li et al.

(10) Patent No.: US 12,355,242 B1
(45) Date of Patent: Jul. 8, 2025

(54) DISTRIBUTED PHOTOVOLTAIC REGULATION METHOD AND SYSTEM CONSIDERING SAFETY VERIFICATION (71) Applicants: STATE GRID SHANDONG ELECTRIC POWER RESEARCH INSTITUTE, Jinan (CN); STATE GRID SHANDONG ELECTRIC POWER COMPANY, Jinan (CN)

(72) Inventors: Na Li, Jinan (CN); Qiang Zhang, Jinan (CN); Yuanlong Liu, Jinan (CN); Lei Li, Jinan (CN); Yuntao Sun, Jinan (CN); Yudun Li, Jinan (CN); Jiantao Liu, Jinan (CN); Peng Xu, Jinan (CN)

(73) Assignees: STATE GRID SHANDONG ELECTRIC POWER RESEARCH INSTITUTE, Jinan (CN); STATE GRID SHANDONG ELECTRIC POWER COMPANY, Jinan (CN)

( * ) Notice: Subject to any disclaimer, the term of this patent is extended or adjusted under 35 U.S.C. 154(b) by 0 days.

(21) Appl. No.: 19/007,121

(22) Filed: Dec. 31, 2024

Related U.S. Application Data

(63) Continuation of application No. PCT/CN2024/135772, filed on Nov. 29, 2024.

(30) Foreign Application Priority Data

Jul. 2, 2024 (CN) .......................... 202410873868.6

(51) Int. Cl.
H02J 3/00 (2006.01)
H02J 3/38 (2006.01)

(52) U.S. Cl.
CPC .......... H02J 3/00125 (2020.01); H02J 3/381 (2013.01); H02J 2203/20 (2020.01); H02J 2300/26 (2020.01)

(58) Field of Classification Search
CPC .... H02J 3/00125; H02J 3/381; H02J 2203/20; H02J 2300/26
See application file for complete search history.

(56) References Cited

FOREIGN PATENT DOCUMENTS

CN 105281360 A * 1/2016
CN 108110754 A 6/2018
(Continued)

OTHER PUBLICATIONS

Yang, et al., "A Method for Calculating the Security Boundary of Photovoltaic-connected Distribution Networks", Sep. 21, 2023, Powercon 2023, pp. 1-5.
(Continued)

Primary Examiner — Charles Cai
(74) Attorney, Agent, or Firm — MOSER TABOADA (57) ABSTRACT

A distributed photovoltaic regulation method considering safety verification includes acquiring power transmission or power substation equipment limit value, load condition, and distributed photovoltaic aggregation information under equipment, calculating load rate of equipment, calculating total maximum regulation amount or the total over-limit correction amount of distributed photovoltaic power under equipment based on the load rate of equipment and a threshold value, and decomposing total maximum regulation amount or total over-limit correction amount to obtain respective total maximum regulation amount or total over-limit correction amount of each load point; and decomposing respective total maximum regulation amount or total over-limit correction amount of each load point to obtain respective maximum regulation amount or over-limit correction amount of each automatic power generation control unit, correcting respective regulation requirement and generating respective regulation target of each automatic power generation control unit, and sending respective regulation (Continued)

target to each automatic power generation control unit for execution.

16 Claims, 2 Drawing Sheets

(56) References Cited

FOREIGN PATENT DOCUMENTS

| CN | 114784890 | A | * | 7/2022 | ............ G06N 3/006 |
|----|-----------|---|---|--------|------------------------|
| CN | 114977332 | A | | 8/2022 | |
| CN | 115173468 | A | | 10/2022 | |
| CN | 116402406 | A | | 7/2023 | |
| CN | 116470566 | A | | 7/2023 | |
| CN | 116799780 | A | | 9/2023 | |
| CN | 118412937 | A | | 7/2024 | |
| WO | WO 2024022194 | A1 | | 2/2024 | |

OTHER PUBLICATIONS

Liu Wenxia, Zhang Bo, BAI Yaling, et al., "Coordinated Optimization Method for Photovoltaic Capacity and Regulation Capability and Asymmetric Parameters in Distribution Network". Modern Electric Power, Sep. 10, 2023.
Internation Search Report for PCT/CN2024/135772 date Mar. 10, 2025.
Zhou Liangxue, et al. "Analysis of Access Capacity Considering the Correlation between Distributed Photovoltaic Power Sources and Loads" Automation of Electric Power Systems, Feb. 25, 2017, 6 pages, vol. 41, No. 04, (Feb. 25, 2017), DOI:10.7500/AEPS20160427012.

* cited by examiner

DISTRIBUTED PHOTOVOLTAIC REGULATION METHOD AND SYSTEM CONSIDERING SAFETY VERIFICATION

CROSS-REFERENCE TO RELATED APPLICATION(S)

This is a continuation of International Patent Application No. PCT/CN2024/135772, filed Nov. 29, 2024, which claims priority to Chinese Patent Application No. 202410873868.6 filed with the China National Intellectual Property Administration (CNIPA) on Jul. 2, 2024, the disclosures of which are incorporated herein by reference in their entireties.

TECHNICAL FIELD

The present application relates to the field of distributed photovoltaic technology, for example, a distributed photovoltaic regulation method and system considering safety verification.

BACKGROUND

This section provides background technical information related to the present application and does not necessarily constitute the existing art.

Distributed photovoltaic (DP) systems continuously and rapidly connect to the power grid. The impact of PV on grid operation shows a trend of developing from local to global and extending from a distribution network to the main grid.

When the reverse overload level of a high-proportion distributed photovoltaic feeder area is severe, the photovoltaic power flow may further reverse towards higher-level lines. In severe cases, this may cause the main transformer and lines at a 220 kV power substation to experience reverse overload, affecting the flexibility of adjusting grid operational modes.

New energy experiences explosive growth. Regions with better new energy resources tend to gather various types of resources. In addition, distributed photovoltaic systems are being connected on a large scale in concentrated areas. When wind and solar power generation is at a peak, distributed photovoltaic systems may crowd out the transmission channels for wind power and centralized photovoltaic power. Thus, there are risks to the security of the power grid.

SUMMARY

To solve the preceding problems, the present application provides a distributed photovoltaic regulation method and system considering safety verification. By performing safety verification for distributed photovoltaic control, the method can achieve precise control and can address multi-scenario regulation requirements such as power balance and flow over-limit.

To achieve the preceding object, the present application uses the following solutions.

According to a first aspect of the present application, a distributed photovoltaic regulation method considering safety verification is provided.

The method includes acquiring limit values of an power transmission and transformation equipment, load conditions, and distributed photovoltaic aggregation information under the equipment, calculating an load rate of the equipment, calculating the total maximum regulation amount of distributed photovoltaic power under the equipment or the total over-limit correction amount of distributed photovoltaic power under the equipment based on the load rate of the equipment and a threshold value, and decomposing the total maximum regulation amount or the total over-limit correction amount to obtain a respective total maximum regulation amount of each load point or a respective total over-limit correction amount of each load point; and decomposing the respective total maximum regulation amount or the respective total over-limit correction amount of each load point to obtain a respective maximum regulation amount or a respective over-limit correction amount of each automatic power generation control unit, correcting a respective regulation requirement of each automatic power generation control unit, generating a respective regulation target of each automatic power generation control unit, and sending the respective regulation target to each automatic power generation control unit for execution.

Further, each load point is determined as a 10 kV load point according to a modeling boundary of a dispatching and control system for district power grid, and each automatic power generation control unit is a 10 kV or above distributed photovoltaic power station or a low-voltage distributed photovoltaic aggregation unit.

Acquiring the distributed photovoltaic aggregation information under the equipment includes aggregating low-voltage distributed photovoltaic information to a load point of a main grid according to a model affiliation relationship to obtain low-voltage distributed photovoltaic aggregation information of the load point of the main grid and then aggregating the low-voltage distributed photovoltaic aggregation information of the load point of the main grid to each equipment of the main grid through a topology analysis to obtain respective distributed photovoltaic aggregation information under the equipment of each equipment of the main grid.

Further, the total maximum regulation amount of the distributed photovoltaic power under the equipment includes the maximum total downward regulation amount of the distributed photovoltaic power under the equipment.

When an equipment forward load rate is less than a set threshold value K1, the maximum total downward regulation amount of the distributed photovoltaic power under the equipment satisfies $\Delta P_{lim,d}^- = (K_1 - \lambda_d^+) * S_{e,d}$; or when an equipment forward load rate is greater than a set threshold value K1, the maximum total downward regulation amount of the distributed photovoltaic power under the equipment satisfies $\Delta P_{lim,d}^- = 0$.

Here $\Delta P_{lim,d}^-$ denotes the maximum total downward regulation amount of a distributed photovoltaic power under an equipment d, $\lambda_d^+$ denotes the forward load rate of the equipment d, and $S_{e,d}$ denotes an operating limit set for the equipment d.

Further, the total maximum regulation amount of the distributed photovoltaic power under the equipment includes the maximum total absorption amount of the distributed photovoltaic power under the equipment.

When an equipment reverse load rate is greater than 0 and less than a set threshold value K2, the maximum total absorption amount of the distributed photovoltaic power under the equipment satisfies $\Delta P_{lim,d}^+ = (K_2 - \lambda_d^-) * S_{e,d}$; or when an equipment reverse load rate is greater than a set threshold value K2, the maximum total absorption amount of the distributed photovoltaic power under the equipment satisfies $\Delta P_{lim,d}^+ = 0$.

Here $\Delta P_{lim,d}^+$ denotes the maximum total absorption amount of a distributed photovoltaic power under an equipment d, $\lambda_d^-$ denotes the reverse load rate of the equipment d, and $S_{e,d}$ denotes an operating limit set for the equipment d.

Further, the total over-limit correction amount of the distributed photovoltaic power under the equipment satisfies $\Delta P_{crr,d} = (1-\delta\%-\lambda_d^-)*S_{e,d}$. Here $\Delta P_{crr,d}$ denotes the over-limit correction amount of an equipment d, $\delta$ denotes a reserved safety margin, $\lambda_d^-$ denotes the reverse load rate of the equipment d, and $S_{e,d}$ denotes an operating limit set for the equipment d.

Further, the total maximum regulation amount or the total over-limit correction amount is decomposed according to negative sensitivity of active power injection of an equipment to load points, safety constraint conditions of equipments at different voltage levels are verified layer by layer in priority order from low voltage levels to high voltage levels, with successive corrections, so that the total maximum regulation amount of each load point or the total over-limit correction amount of each load point is obtained.

Further, the respective total maximum regulation amount of each load point is decomposed in different manners depending on an allocation strategy in a distributed photovoltaic automatic power generation control group.

In response to the allocation strategy in the distributed photovoltaic automatic power generation control group being a priority allocation strategy, then in each round, based on a respective initial regulation requirement of each automatic power generation control unit under each load point, the total regulation requirement of automatic power generation control units under each load point is calculated and is verified to exceed the respective total maximum regulation amount of each load point or not; and when an initial regulation requirement is allocated to an automatic power generation control unit so that a total regulation requirement of a load point to which the automatic power generation control unit is connected exceeds the total maximum regulation amount, then no regulation requirement is allocated to the automatic power generation control unit, until the total regulation requirement of the automatic power generation control units under each load point is completely allocated; or in response to the allocation strategy in the distributed photovoltaic automatic power generation control group being an installed-capacity-based proportional allocation strategy, then the respective total maximum regulation amount of each load point is allocated to automatic power generation control units under each load point according to installed capacity proportions.

Here in each command cycle, the respective initial regulation requirement of each automatic power generation control unit is corrected according to a respective regulation step size, a respective capacity constraint, and the respective maximum regulation amount of each automatic power generation control unit.

Further, the respective total over-limit correction amount of each load point is decomposed to a respective automatic power generation control unit under each load point in the same manner and in accordance with an intra-group allocation strategy to serve as a downward regulation amount of the respective automatic power generation control unit, where the intra-group allocation strategy is selected by distributed photovoltaic automatic power generation control.

Further, when the total regulation requirement of an automatic power generation control region is in the same direction as an over-limit correction amount, the absolute value of the respective regulation requirement of each automatic power generation control unit is the maximum of the absolute value of the initial regulation requirement obtained by decomposition according to a set strategy and the absolute value of the respective over-limit correction amount of each automatic power generation control unit, and the direction of the respective regulation requirement of each automatic power generation control unit is downward; or when the total regulation requirement of an automatic power generation control region is in an opposite direction to an over-limit correction amount, an automatic power generation control unit under a blocked equipment is executed according to an allocated over-limit correction amount, a downward regulation amount generated by the blocked equipment is inversely added to the total regulation requirement of the automatic power generation control region, and the total regulation requirement of the automatic power generation control region is decomposed according to an inter-group allocation strategy and an intra-group allocation strategy to obtain the respective regulation requirement of each automatic power generation control unit, where a control unit participating in over-limit correction does not participate in decomposition and allocation of the current round of district total regulation requirement.

According to a second aspect of the present application, a distributed photovoltaic regulation system considering safety verification is provided. The system includes a regulation safety verification module and a distributed photovoltaic automatic power generation control module.

The regulation safety verification module is configured to acquire limit values of an power transmission and transformation equipment, load conditions, and distributed photovoltaic aggregation information under the equipment, calculate an load rate of the equipment, calculate the total maximum regulation amount of distributed photovoltaic power under the equipment or the total over-limit correction amount of distributed photovoltaic power under the equipment based on the load rate of the equipment and a threshold value, and decompose the total maximum regulation amount or the total over-limit correction amount to obtain a respective total maximum regulation amount of each load point or a respective total over-limit correction amount of each load point. The distributed photovoltaic automatic power generation control module is configured to decompose the respective total maximum regulation amount or the respective total over-limit correction amount of each load point to obtain a respective maximum regulation amount or a respective over-limit correction amount of each automatic power generation control unit, correct a respective regulation requirement of each automatic power generation control unit, generate a respective regulation target of each automatic power generation control unit, and send the respective regulation target to each automatic power generation control unit for execution.

Further, the system also includes a resource aggregation module. The resource aggregation module is configured to aggregate low-voltage distributed photovoltaic information to a load point of a main grid according to a model affiliation relationship to obtain low-voltage distributed photovoltaic aggregation information of the load point of the main grid and then aggregate the low-voltage distributed photovoltaic aggregation information of the load point of the main grid to each equipment of the main grid through a topology analysis to obtain respective distributed photovoltaic aggregation information under the equipment of each equipment of the main grid.

Compared with the related art, the present application has the following the beneficial effects.

The present application is based on a hierarchical collaborative control architecture. Through regulation safety verification and according to the load rate of the equipment status, the present application provides safety constraint conditions for distributed photovoltaic control, enabling precise control of distributed photovoltaic power while addressing multi-scenario regulation requirements such as power balance and flow over-limit.

BRIEF DESCRIPTION OF DRAWINGS

The drawings that constitute part of the present application facilitate a better understanding of the present application. The illustrative embodiments of the present application and their descriptions are intended to explain, not to limit, the present application.

DETAILED DESCRIPTION

The present application is further described below in conjunction with drawings and embodiments.

It is to be noted that the following detailed descriptions are illustrative and intended to provide further clarification for the present application. Unless otherwise defined, all technical and scientific terms used herein have meanings the same as those commonly understood by those skilled in the art to which the present application pertains.

Without conflict, embodiments of the present application and features of the embodiments in this application can be combined with each other. The following further explanation of this application will be provided with reference to the accompanying drawings and embodiments.

Embodiment One

This embodiment provides a distributed photovoltaic regulation method considering safety verification.

Figure 2:
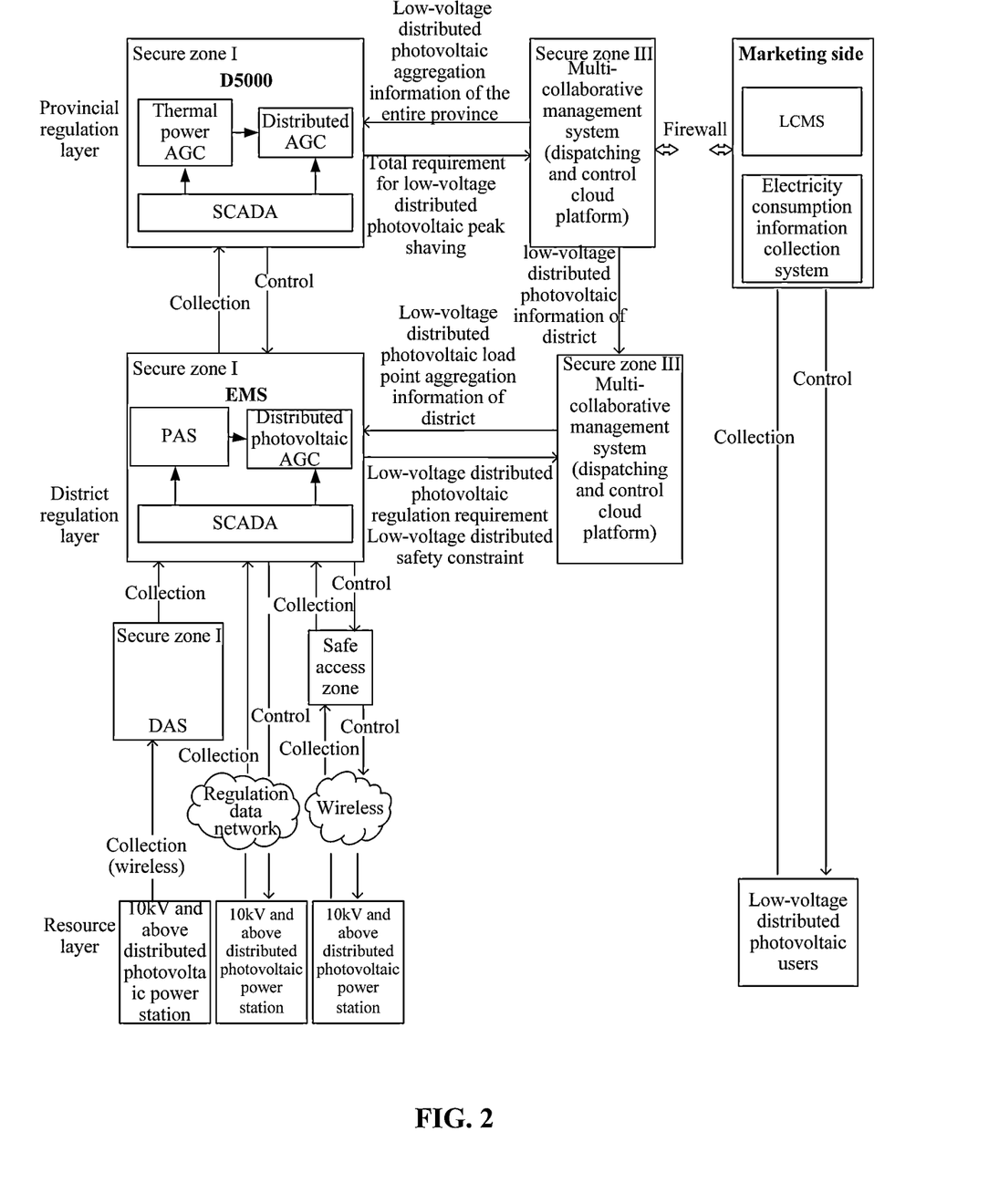
FIG. 2 is a diagram of a hierarchical collaborative control architecture according to embodiment one of the present application.

The distributed photovoltaic regulation method considering safety verification according to this embodiment relies on a distributed photovoltaic provincial-district (county) hierarchical collaborative control architecture shown in FIG. 2. A supervisory control and data acquisition (SCADA) system, a distributed photovoltaic automatic generation control (AGC) system, and a thermal power AGC system are deployed at the provincial regulation layer. An SCADA system, a distributed photovoltaic AGC system, and a power application system (PAS) are deployed at the district regulation layer. This architecture enables interaction between a control center and distributed photovoltaic systems at various voltage levels. The distribution side is equipped with a distribution automation system. The marketing side is equipped with an Automatic Meter Reading (AMR) and a load control management system (LCMS).

Based on the hierarchical collaborative control architecture, the provincial regulation layer and the district regulation layer interact on district distributed photovoltaic aggregation information, provincial-district collaboration status information, and district distributed photovoltaic provincial-district collaborative control objectives.

The district regulation layer achieves data collection and control command delivery for distributed photovoltaic power stations of 10 kV and above through an electric power dispatching data network or a 5G wireless private network via a secure access zone. The district regulation layer also achieves wireless data collection for distributed photovoltaic power stations of 10 kV and above through a distribution automation system (secure zone I).

The regulation layers achieves low-voltage distributed photovoltaic information interaction through the integration of a regulation smart grid regulation and control system (D5000 system) (secure zone I) at the provincial regulation layer, an energy management systems (EMS) (secure zone I) at the district regulation layer, a provincial (district) multi-collaborative management system (dispatching and control cloud platform) (secure zone III), and an automatic meter reading (AMR) system and a load control management system at a marketing side.

The AMR system collects low-voltage distributed photovoltaic information and forwards the data to the multi-collaborative management system at the provincial regulation layer. The multi-collaborative management system at the provincial regulation layer sends the low-voltage distributed photovoltaic aggregation information of the entire province to the D5000 system at the provincial regulation layer, receives a low-voltage distributed photovoltaic overall regulation target generated by the D5000 system at the provincial regulation layer, forwards the target to the marketing-side load control management system, and sends the target to low-voltage distributed photovoltaic users. Also, the multi-collaborative management system at the provincial regulation layer sends the low-voltage distributed photovoltaic information from each region to a corresponding multi-collaborative management system for aggregation at the district regulation layer, sends the data to the EMS at the district regulation layer, receives low-voltage distributed photovoltaic regulation requirements and security constraint generated by the EMS at the district regulation layer, and forwards the data to the marketing-side load control management system for decomposition and distribution to low-voltage distributed photovoltaic users for execution, thereby achieving monitoring and control of low-voltage distributed photovoltaic power by both the provincial regulation layer and the district regulation layer.

Due to the characteristics of low-voltage distributed photovoltaic power sources, such as a large number and a small individual capacity, modeling them individually in the EMS as conventional generators would involve a large and cumbersome amount of work. Therefore, the multi-collaborative management system at the district regulation layer aggregates, layer by layer based on model affiliation (power substation 10 kV outgoing line-transformer area-distribution transformer-low-voltage distributed photovoltaic users), the low-voltage distributed photovoltaic information (forwarded by and received from the provincial regulation layer) to a main grid 10 kV load equipment at the regulation side to form the main grid 10 kV load point low-voltage distributed photovoltaic aggregation information (that is, district low-voltage distributed photovoltaic and 10 kV load point photovoltaic aggregation information or distributed photovoltaic aggregation information under a 10 kV load point) and sends the information to the EMS at the district regulation layer to participate in PAS safety verification and distributed photovoltaic AGC control at the district regulation layer.

After the EMS at the district regulation layer acquires the main grid 10 kV load point low-voltage distributed photovoltaic aggregation information forwarded by the multi-collaborative management system and the directly collected 10 kV and above distributed photovoltaic power station data, the PAS further performs distributed photovoltaic resource aggregation based on topological analysis and, according to dimensions such as the main transformer, busbar, and lines, obtains the distributed photovoltaic photovoltaic aggregation information under the corresponding equipment (that is, the aggregation amount of distributed photovoltaic resources under the equipment or the distributed photovoltaic aggregation information under the equipment). The process is as follows: Topological analysis is conducted based on the hierarchical characteristics of the power grid at different voltage levels. Within the same voltage level, topological search analysis is performed using the breadth-first search method so that the connection relationships of the connected lines are partitioned. Through topological analysis, the distributed photovoltaic power sources connected at low voltage levels are traced step by step upwards from the 10 kV load point along the supply path, obtaining the aggregation amount of distributed photovoltaic resources under equipments such as main transformers, busbars, and lines at different levels of the analyzed grid. The aggregation model attributes include current active power, total capacity, and adjustable capacity.

Figure 1:
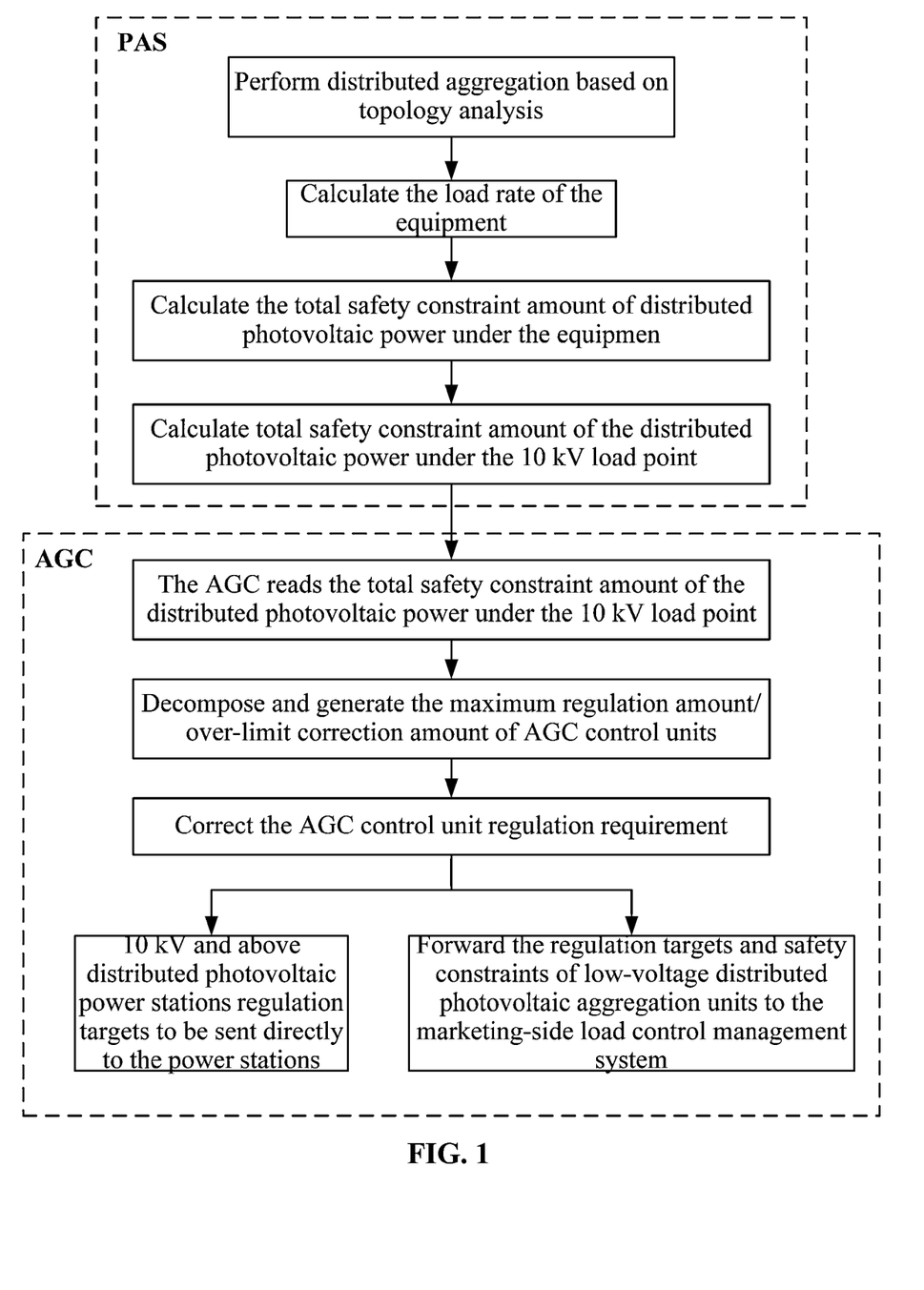
FIG. 1 is a flowchart of a distributed photovoltaic regulation method considering safety verification according to embodiment one of the present application.

The distributed photovoltaic regulation method considering safety verification according to this embodiment, as shown in FIG. 1, includes the following steps:

Step 1: The power application system (PAS) safety verification function, determines, based on the equipment forward/reverse load rate, whether the equipment is overloaded or over-limited and to what extent the equipment is overloaded or over-limited, calculates the total security constraint amount of the distributed photovoltaic power under the equipment, and calculates, based on the sensitivity information of equipment and 10 kV load point active power injection, the total security constraint amount of distributed photovoltaic power under each 10 kV load point, including: the maximum total downward regulation amount of distributed photovoltaic power under the 10 kV load point, the maximum total absorption amount of distributed photovoltaic power under the 10 kV load point, and the total over-limit correction amount of distributed photovoltaic power under the 10 kV load point, which are then provided to the AGC.

(1) Load Rate

The thermal stability assessment is based on the principle that the thermal stability of grid transmission and power substation equipment, such as transformers and lines, should not exceed limits. The thermal stability assessment is performed based on the load rate of the equipment. The load rate of the equipment is calculated based on factors such as a grid operating mode, limit values of an power transmission and transformation equipment (the actual operating limit of a transformer or a line), load conditions (measured load of the equipment), and distributed photovoltaic aggregation information under the equipment (the distributed photovoltaic power output of a transformer or a line).

The load rate of the equipment includes a forward load rate and a reverse load rate.

The reverse load rate is calculated using the following formula:

$$\lambda^- = \frac{P_D - P_L}{S_e} \times 100\%.$$

$$P_t = P_L - P_D.$$

In the formula, $P_D$ denotes the distributed photovoltaic power output of the transformer or line, $S_e$ denotes the actual operating limit of the transformer or line, $P_L$ denotes the equipment power load of the transformer or line, that is, the load excluding the distributed photovoltaic power output, and the currently measured equipment load $P_t$ denotes the coupled value of the equipment power load and all power output, that is, $P_t = P_L - P_D$.

Therefore, the calculation formula for the reverse load rate is corrected as:

$$\lambda^- = \frac{P_t}{S_e} \times 100\%.$$

Similarly, when $P_t > 0$, the equipment forward load rate satisfies $$\lambda^+ = \frac{P_t}{S_e} \times 100\%.$$

(2) Calculation of the Total Equipment Distributed Photovoltaic Security Constraint Amount Based on the equipment forward/reverse load rate and the set threshold value, the operating status of the equipment is determined, and the total equipment distributed photovoltaic security constraint amount (including the total maximum regulation amount of distributed photovoltaic power under the equipment or the total over-limit correction amount of distributed photovoltaic power under the equipment) is calculated.

(201) When the equipment forward load rate is lower than the set threshold value K1, it is considered a normal state. At this point, based on the load rate of the equipment and the set threshold value K1, the maximum total downward regulation amount of the distributed photovoltaic power under the equipment is calculated and decomposed to the high-sensitivity 10 kV load points according to the set strategy.

The maximum total downward regulation amount of the distributed photovoltaic power under the equipment is calculated using the formula $\Delta P_{lim,d}^- = (K_1 - \lambda_d^+) * S_{e,d}$.

Here $\Delta P_{lim,d}^-$ denotes the maximum total downward regulation amount of the distributed photovoltaic power under the equipment d, $\lambda_d^+$ denotes the forward load rate of the equipment d, and $S_{e,d}$ denotes the operating limit set for the equipment d.

(202) When the equipment forward load rate is less than the set threshold value K1, overload or over-limit occurs. To prevent the flow from deteriorating, the maximum total downward regulation amount of the distributed photovoltaic power of each high-sensitivity 10 kV load point is 0. That is, the maximum total downward regulation amount of the distributed photovoltaic power under the equipment satisfies $\Delta P_{lim,d}^- = 0$.

In this case, the 10 kV and above distributed photovoltaic power station and low-voltage distributed photovoltaic aggregation unit under the 10 kV load point are both prohibited from downward regulation, and the current output serves as the lower regulation limit.

(203) When the equipment reverse load rate $\lambda^-$ is greater than 0 and less than the set threshold value K2, the reverse delivery state occurs. At this point, based on the equipment reverse load rate and the set threshold value K2, the maximum total absorption amount of the distributed photovoltaic power under the equipment is calculated and decomposed to high-sensitivity 10 kV load points according to the set strategy.

The maximum total absorption amount of the distributed photovoltaic power under the equipment satisfies $\Delta P_{lim,d}^+ = (K_2 - \lambda_d^-) * S_{e,d}$. Here $\Delta P_{lim,d}$ denotes the maximum total absorption amount of the distributed photovoltaic power under the equipment d, $\lambda_d^-$ denotes the reverse load rate of the equipment d, and $S_{e,d}$ denotes the operating limit set for the equipment d.

(204) When the equipment reverse load rate $\lambda^-$ is greater than the set threshold value K2, reverse overload occurs. To prevent the flow from deteriorating, the maximum total absorption amount of the distributed photovoltaic power of each high-sensitivity 10 kV load point is 0. That is, the maximum total absorption amount of the distributed photovoltaic power under the equipment satisfies $\Delta P_{lim,d}^+ = 0$.

In this case, the 10 kV and above distributed photovoltaic power station and the low-voltage distributed photovoltaic aggregation unit under the 10 kV load point are both prohibited from upward regulation, and the current output serves as the upper regulation limit.

(205) When the equipment reverse load rate $\lambda^-$ exceeds 100%, indicating a reverse over-limit state, the total over-limit correction amount of the distributed photovoltaic power under the equipment is calculated and decomposed according to the set strategy to the high-sensitivity 10 kV load points, that is, the distributed photovoltaic downward regulation requirement of the 10 kV load point.

The equipment over-limit correction amount is calculated based on the set operating limit and actual power flow. Considering the safety margin introduced into the security buffer zone, the total over-limit correction amount of the distributed photovoltaic power under the equipment satisfies $\Delta P_{crr,d} = (1 - \delta\% - \lambda_d^-) * S_{e,d}$. Here $\Delta P_{crr,d}$ denotes the over-limit correction amount of the equipment d, $\delta$ denotes the reserved safety margin, $\lambda_d^-$ denotes the reverse load rate of the equipment d, and $S_{e,d}$ denotes the operating limit set for the equipment d.

(3) Calculation of the Total Security Constraint Amount of Distributed Photovoltaic Power Under Each 10 kV Load Point Through sensitivity analysis of the active power injection of the equipment to the 10 kV load point, the total maximum regulation amount of the distributed photovoltaic power under the equipment (including the total maximum downward regulation amount and the total maximum absorption amount) or the total overload correction amount is decomposed to each 10 kV load point. This generates the total maximum regulation amount and the total overload correction amount of each 10 kV load point, which are then sent to the distributed photovoltaic AGC for correcting the corresponding distributed photovoltaic regulation requirements.

Considering the impact of distributed photovoltaic power on reverse power flow at the 10 kV and above grid equipment, the 10 kV load points are evaluated using negative sensitivity indicators. To minimize the output regulation amount of nodes that eliminate equipment overload, nodes with higher sensitivity are prioritized for regulation. A sensitivity threshold value is set such that when the negative sensitivity of the 10 kV load point to the equipment exceeds the threshold value, the equipment security constraints are undertaken. That is, corresponding to the equipment operating status, upward/downward regulation is forbidden or decomposing is performed to obtain the maximum regulation amount or power flow correction amount. The calculation formula is as follows:

$$\Delta P_{d,i} = \frac{\Delta P_d}{s_{d,i}}.$$

In the formula, $s_{d,i}$ denotes the negative sensitivity of the active power injection of the equipment d to the 10 kV load point i, $\Delta P_d$ denotes the active power change amount of the equipment d, corresponding to $\Delta P_{lim,d}^-$, $\Delta P_{lim,d}^+$, and $\Delta P_{crr,d}$, and $\Delta P_{d,i}$ denotes the active power change amount of the distributed photovoltaic power at the 10 kV load point i, that is, the total security constraint amount of distributed photovoltaic power at the corresponding 10 kV load point i generated from the sensitivity analysis and thermal stability constraint of the equipment d, and denotes the total maximum regulation amount or total overload correction amount of the 10 kV load point i.

The impact of distributed photovoltaic (PV) connection extends from the connected voltage level to a higher voltage level in the main grid. The safety verification starts from the 10 kV load point and proceeds upward, layer by layer, from the low voltage level (lower layer) to the high voltage level (upper layer). The security constraints for the 10 kV load point are obtained from the progressive regulation. During this bottom-to-top correction process, the maximum adjustable amount is the minimum absolute value, and the overload correction amount is the maximum absolute value. Ultimately, the maximum adjustable amount and overload correction amount for each 10 kV load point are obtained.

Step 2: The AGC periodically reads the maximum total regulation amount (including the maximum total downward regulation amount and the maximum total absorption amount) of the 10 kV load points calculated and generated by the PAS safety verification function. The maximum total regulation amount is decomposed according to the set strategy into the maximum regulation amount of each of the 10 kV and above distributed photovoltaic power stations and low-voltage distributed photovoltaic aggregation units. This amount obtained from the decomposition is then used as the constraint sent by the AGC command.

According to the intra-group allocation strategy selected by the distributed photovoltaic AGC, the maximum total regulation amount of the 10 kV load point is used as the total command limit of the AGC control units (10 kV and above distributed photovoltaic power stations or low-voltage distributed photovoltaic aggregation units) under the 10 kV load point.

(1) When the Distributed Photovoltaic AGC Uses a Priority Allocation Strategy

When the distributed photovoltaic AGC performs initial regulation requirement allocation based on load rate ranking (downward regulation requirement is ranked from high to low according to the load rate, and upward regulation requirement is ranked from low to high according to the load rate), in a certain round, the total regulation requirement for the AGC control units (10 kV and above distributed photovoltaic power stations or low-voltage distributed photovoltaic aggregation units) under the 10 kV load point is calculated in real time. It is then verified whether the total regulation requirement exceeds the maximum total regulation amount. If allocation to a certain AGC control unit causes the total regulation requirement of the connected 10 kV load point to exceed the maximum total regulation amount, the AGC control unit is skipped, and no regulation requirement is allocated in this round, until the total regulation requirement is fully allocated.

(2) When the Distributed Photovoltaic AGC Uses a Proportional Allocation Strategy When the distributed photovoltaic AGC performs proportional allocation based on the installed capacity, the maximum regulation amount is also allocated proportionally to the installed capacity, meaning that the larger the installed capacity, the larger the allocated maximum regulation amount. The calculation formula is as follows: $\Delta P_k = \Delta P_{d,i} * (P_k^{max}/\Sigma_{k=1}^N p_k^{max})$. In the formula, $\Delta P_k$ denotes the maximum regulation amount allocated to the AGC control unit k under 10 kV load point i $P_k^{max}$ denotes the installed capacity of AGC control unit k, N denotes the total number of AGC control units under the 10 kV load point i, and $\Delta P_{d,i}$ denotes the total maximum regulation amount of the distributed photovoltaic power under the 10 kV load point i.

The current real-time output of the AGC control unit, added to the maximum regulation amount, results in the AGC control unit regulation limit value considering PAS safety verification. That is, the current real-time output of the AGC control unit, added to the maximum downward regulation amount, is the lower regulation limit of the control unit. When the maximum downward regulation amount is 0, downward regulation is prohibited, and the lower regulation limit is the current real-time output. The current real-time output of the AGC control unit, added to the maximum absorption amount, is the upper regulation limit of the control unit. When the maximum absorption amount is 0, upward regulation is prohibited, and the upper regulation limit is the current real-time output. The intersection between the AGC control unit regulation limit value considering PAS safety verification and the upper and lower limit values set by the AGC serves as the actual regulation limit value of the AGC control unit.

In each command cycle, the initial regulation requirement allocated to each of the AGC control units (10 kV and above distributed photovoltaic power stations or low-voltage distributed photovoltaic aggregation units) is corrected based on its regulation step size and operating limit value, resulting in the regulation requirement for each control unit, that is, $|\Delta R_k'| = \min(|\Delta R_k|, S_k, |\Delta P_{k,max}|)$. In the formula, $\Delta R_k'$ denotes the corrected AGC regulation requirement for the control unit k, $\Delta R_k$ denotes the initial AGC regulation requirement for the control unit k obtained through decomposition and allocation according to the set strategy, $S_k$ denotes the regulation step size of the control unit k, and $\Delta P_{k,max}$ denotes the operating limit value of the control unit k considering the grid safety verification, taking the intersection between the capacity constraint and the safety verification constraint (the maximum regulation amount $\Delta P_k$) and considering only the constraint in the same direction as the regulation requirement.

The current real-time output of the control unit plus the corrected regulation requirement gives the regulation target of the control unit.

Step 3: The AGC periodically reads the over-limit correction amount of the 10 kV load point calculated by the PAS safety verification function, decomposes the over-limit correction amount according to the set strategy to the 10 kV and above distributed photovoltaic power stations and low-voltage distributed photovoltaic aggregation units, and corrects the AGC regulation requirement.

(1) Over-Limit Correction Amount Allocation Logic

The total over-limit correction amount of the 10 kV load point is allocated only among the AGC control units associated with the 10 kV load point. In line with the distributed photovoltaic AGC requirement allocation strategy, when the distributed photovoltaic AGC requirements are allocated according to load rate ranking, the over-limit correction amount is also allocated according to the load rate ranking; and when the distributed photovoltaic AGC requirements are allocated proportionally according to the installed capacity, the over-limit correction amount is also allocated proportionally according to the installed capacity. This results in the over-limit correction amount (downward regulation amount) of the 10 kV and above distributed photovoltaic power stations and low-voltage distributed photovoltaic aggregation units under the 10 kV grid-connected point.

(2) AGC Regulation Requirement Correction

When the AGC district total regulation requirement is in the same direction as the over-limit correction amount, the regulation requirement allocated to each of the AGC control units (10 kV and above distributed photovoltaic power stations or low-voltage distributed photovoltaic aggregation units) is calculated using the formula: $\Delta R_k'' = -\max(|\Delta R_k|, |\Delta P_{crr,k}|)$. In the formula, $\Delta R_k''$ denotes the corrected AGC regulation requirement for the control unit k, $\Delta R_k$ denotes the initial AGC regulation requirement for the control unit k obtained through decomposition and allocation according to the set strategy, and $\Delta P_{crr,k}$ denotes the over-limit regulation amount decomposed to the control unit k by the 10 kV load point.

When the AGC district total regulation requirements and the over-limit correction amount are in opposite directions, the AGC control units under the blocked equipment (10 kV and above distributed photovoltaic power stations and low-voltage distributed photovoltaic aggregation units) are executed according to the allocated over-limit correction (downward regulation) amount. At the same time, the downward regulation amount generated by the blocked equipment is reversely added to the AGC district total regulation requirements and then decomposed according to the inter-group allocation strategy and the intra-group allocation strategy. The control units involved in over-limit correction do not participate in the decomposition and allocation of the current district total regulation requirements. The corrected regulation requirements for the AGC control units (10 kV and above distributed photovoltaic power stations and low-voltage distributed photovoltaic aggregation units) are thus obtained.

Based on the corrected regulation requirements for the AGC control units, the regulation targets of the AGC control units (10 kV and above distributed photovoltaic power stations and low-voltage distributed photovoltaic aggregation units) are generated.

Step 4: The regulation targets of 10 kV and above distributed photovoltaic power stations are sent by the AGC at the district regulation layer to the power stations for execution. In the provincial-district collaborative control mode, the low-voltage distributed photovoltaic total regulation target is forwarded by the AGC at the provincial regulation layer through the multi-collaborative management system (deployed on the dispatching and control cloud platform at the secure zone III) to the marketing-side load control management system, and the security constraints for low-voltage distributed photovoltaic aggregation units are forwarded by the AGC at the district regulation layer through the multi-collaborative management system (deployed on the dispatching and control cloud platform at the secure zone III) to the marketing-side load control management system. In the district independent control mode, the regulation targets and security constraints for low-voltage distributed photovoltaic aggregation units are both forwarded by the AGC at the district regulation layer through the multi-collaborative management system (deployed on the dispatching and control cloud platform at the secure zone III) to the marketing-side load control management system and then decomposed and sent by the marketing-side load control management system to low-voltage distributed photovoltaic users.

In this embodiment, the distributed photovoltaic AGC system at the provincial regulation layer and the distributed photovoltaic AGC system at the district regulation layer select different control modes for different regulation scenarios to generate the total distributed photovoltaic AGC region regulation requirements at the corresponding layer.

The control modes are divided into provincial-district collaborative control mode and district independent control mode based on whether the provincial centralized unified control is applied.

In the provincial-district collaborative control mode which is used for provincial unified control scenarios such as peak shaving across the whole network, the total regulation requirements are generated by the distributed photovoltaic AGC at the provincial regulation layer. Based on district distributed photovoltaic adjustable total installed capacity, total real-time output, total regulation upper limit, total regulation lower limit, and other district distributed photovoltaic aggregation information, the 10 kV and above distributed photovoltaic regulation requirements are decomposed and sent to each AGC at the district regulation layer. The AGC at the district regulation layer further decomposes and sends the requirements to the 10 kV and above distributed photovoltaic power stations (resource layer) for execution. Also, the low-voltage distributed photovoltaic total regulation target is forwarded to the marketing-side load control management system. The marketing-side load control management system decomposes the regulation target and sends the regulation target to low-voltage distributed photovoltaic users (resource layer) for execution. In this mode, the AGC at the district regulation layer distributed photovoltaic area total regulation requirements and low-voltage distributed photovoltaic total regulation target are both generated by the distributed photovoltaic AGC at the provincial regulation layer, and the security constraints are generated by the distributed photovoltaic AGC at the district regulation layer.

In the district independent control mode which is used for district control scenarios such as district partition balance control and section flow control, the distributed photovoltaic AGC at the district regulation layer generates regulation requirements for the region and decomposes these requirements into the regulation requirements for 10 kV and above distributed photovoltaic power stations and the regulation requirements for 10 kV load point low-voltage distributed photovoltaic aggregation units. The 10 kV and above distributed photovoltaic stations regulation targets to be directly sent to the distributed photovoltaic power stations for execution. The regulation requirements and security constraints for 10 kV load point low-voltage distributed photovoltaic aggregation units are forwarded to the marketing-side load control management system and then decomposed and sent to low-voltage distributed photovoltaic users for execution. In this mode, the AGC at the district regulation layer distributed photovoltaic area total regulation requirements and the low-voltage distributed photovoltaic regulation targets and security constraints are all generated by the distributed photovoltaic AGC at the district regulation layer.

The distributed photovoltaic regulation method considering safety verification according to this embodiment achieves safety verification and precise control of distributed photovoltaic control based on the provincial-district hierarchical collaborative control architecture, satisfying multi-scenario regulation requirements such as power balance and flow over-limit.

Embodiment Two

This embodiment provides a distributed photovoltaic regulation system considering safety verification. The system includes a PAS resource aggregation module, a PAS regulation safety verification module, and a distributed photovoltaic AGC module.

The PAS resource aggregation module is configured to acquire main grid 10 kV load point low-voltage distributed photovoltaic aggregation information forwarded by a multi-collaborative management system and directly collected 10 kV and above distributed photovoltaic power station data; perform resource aggregation based on topological analysis; and according to dimensions such as the main transformer, busbar, and lines, obtain distributed photovoltaic photovoltaic aggregation information under the corresponding equipment.

The PAS regulation safety verification module is configured to acquire a grid operating mode, limit values of an power transmission and transformation equipment, and the distributed photovoltaic photovoltaic aggregation information under the 10 kV load point, and perform base-state power flow verification to obtain an load rate of the equipment; and based on the load rate of the equipment and a set threshold value, calculate the total distributed photovoltaic security constraint amount under the equipment, including the total maximum regulation amount of distributed photovoltaic power under the equipment or the total over-limit correction amount of distributed photovoltaic power under the equipment, and calculate the total distributed photovoltaic security constraint amount under the 10 kV load point (including a respective total maximum regulation amount of each load point and a respective total over-limit correction amount of each load point) based on sensitivity analysis.

The distributed photovoltaic AGC module is configured to calculate district regulation requirements according to a set control mode, calculate regulation requirements for generation control units (10 kV and above distributed photovoltaic power stations and low-voltage distributed photovoltaic aggregation units) according to an inter-group allocation strategy and an intra-group allocation strategy, periodically read the total distributed photovoltaic security constraint amount under the 10 kV load point calculated by the PAS regulation safety verification module, perform decomposition according to a certain allocation strategy to obtain the total security constraint amount of the control units, including the maximum regulation amount and the over-limit correction amount, adjust the control unit regulation requirements to obtain a respective regulation target of each control unit, and send the respective regulation target of each control unit to the power station or marketing side for execution.

What is claimed is:

1. A distributed photovoltaic regulation method considering safety verification, comprising:

acquiring limit values of an power transmission and transformation equipment, load conditions, and distributed photovoltaic aggregation information under the equipment, calculating an load rate of the equipment, calculating a total maximum regulation amount of distributed photovoltaic power under the equipment or a total over-limit correction amount of distributed photovoltaic power under the equipment based on the load rate of the equipment and a threshold value, and decomposing the total maximum regulation amount or the total over-limit correction amount to obtain a respective total maximum regulation amount of each load point or a respective total over-limit correction amount of each load point; and decomposing the respective total maximum regulation amount or the respective total over-limit correction amount of each load point to obtain a respective maximum regulation amount or a respective over-limit correction amount of each automatic power generation control unit, correcting a respective regulation requirement of each automatic power generation control unit, generating a respective regulation target of each automatic power generation control unit, and sending the respective regulation target to each automatic power generation control unit for execution, wherein the total maximum regulation amount of the distributed photovoltaic power under the equipment comprises a maximum total downward regulation amount of the distributed photovoltaic power under the equipment, and the maximum total downward regulation amount of the distributed photovoltaic power under the equipment satisfies $\Delta P_{lim,d}^- = (K_1 - \lambda_d^+) * S_{e,d}$ or $\Delta P_{lim,d}^- = 0$, wherein $\Delta P_{lim,d}^-$ denotes a maximum total downward regulation amount of a distributed photovoltaic power under an equipment d, $\lambda_d^+$ denotes a forward load rate of the equipment d, and $S_{e,d}$ denotes an operating limit set for the equipment d;

wherein the total maximum regulation amount of the distributed photovoltaic power under the equipment comprises a maximum total absorption amount of the distributed photovoltaic power under the equipment, and the maximum total absorption amount of the distributed photovoltaic power under the equipment satisfies $\Delta P_{lim,d}^+ = (K_2 - \lambda_d^-) * S_{e,d}$ or $\Delta P_{lim,d}^+ = 0$, wherein $\Delta P_{lim,d}^+$ denotes a maximum total absorption amount of a distributed photovoltaic power under an equipment d, $\lambda_d^-$ denotes a reverse load rate of the equipment d, and $K_1$ and $K_2$ are each a set threshold value;

wherein the total over-limit correction amount of the distributed photovoltaic power under the equipment satisfies $\Delta P_{crr,d} = (1 - \delta\% - \lambda_d^-) * S_{e,d}$, wherein $\Delta P_{crr,d}$ denotes an over-limit correction amount of an equipment d, and $\delta$ denotes a reserved safety margin;

wherein the total maximum regulation amount or the total over-limit correction amount is decomposed according to negative sensitivity of active power injection of an equipment to load points;

wherein the respective total maximum regulation amount of each load point is decomposed in different manners depending on an allocation strategy in a distributed photovoltaic automatic power generation control group; and in response to the allocation strategy in the distributed photovoltaic automatic power generation control group being a priority allocation strategy, then in each round, based on a respective initial regulation requirement of each automatic power generation control unit under each load point, a total regulation requirement of automatic power generation control units under each load point is calculated and is verified to exceed the respective total maximum regulation amount of each load point or not; and when an initial regulation requirement is allocated to an automatic power generation control unit so that a total regulation requirement of a load point to which the automatic power generation control unit is connected exceeds the total maximum regulation amount, then no regulation requirement is allocated to the automatic power generation control unit, until the total regulation requirement of the automatic power generation control units under each load point is completely allocated; or in response to the allocation strategy in the distributed photovoltaic automatic power generation control group being an installed-capacity-based proportional allocation strategy, then the respective total maximum regulation amount of each load point is allocated to automatic power generation control units under each load point according to installed capacity proportions; and wherein the respective total over-limit correction amount of each load point is decomposed to a respective automatic power generation control unit under each load point in a same manner and in accordance with an intra-group allocation strategy to serve as a downward regulation amount of the respective automatic power generation control unit, wherein the intra-group allocation strategy is selected by distributed photovoltaic automatic power generation control.

2. The distributed photovoltaic regulation method considering safety verification according to claim 1, wherein each load point is determined as a 10 kV load point according to a modeling boundary of a dispatching and control system for district power grid, and each automatic power generation control unit is a 10 kV or above distributed photovoltaic power station or a low-voltage distributed photovoltaic aggregation unit; and acquiring the distributed photovoltaic aggregation information under the equipment comprises aggregating low-voltage distributed photovoltaic information to a load point of a main grid according to a model affiliation relationship to obtain low-voltage distributed photovoltaic aggregation information of the load point of the main grid and aggregating the low-voltage distributed photovoltaic aggregation information of the load point of the main grid to each equipment of the main grid through a topology analysis to obtain respective distributed photovoltaic aggregation information under each equipment of the main grid.

3. The distributed photovoltaic regulation method considering safety verification according to claim 1, wherein when an equipment forward load rate is less than a set threshold value K1, the maximum total downward regulation amount of the distributed photovoltaic power under the equipment satisfies $\Delta P_{lim,d}^- = (K_1 - \lambda_d^+) * S_{e,d}$; or when an equipment forward load rate is greater than a set threshold value K1, the maximum total downward regulation amount of the distributed photovoltaic power under the equipment satisfies $\Delta P_{lim,d}^- = 0$.

4. The distributed photovoltaic regulation method considering safety verification according to claim 1, wherein when an equipment reverse load rate is greater than 0 and less than a set threshold value K2, the maximum total absorption amount of the distributed photovoltaic power under the equipment satisfies $\Delta P_{lim,d}^{+}=(K_2-\lambda_d^{-})*S_{e,d}$; or when an equipment reverse load rate is greater than a set threshold value K2, the maximum total absorption amount of the distributed photovoltaic power under the equipment satisfies $\Delta P_{lim,d}^{+}=0$.

5. The distributed photovoltaic regulation method considering safety verification according to claim 1, wherein
the total maximum regulation amount is decomposed as follows: safety constraint conditions of equipments at different voltage levels are verified layer by layer in priority order from low voltage levels to high voltage levels, with successive corrections, so that the total maximum regulation amount of each load point is obtained.

6. The distributed photovoltaic regulation method considering safety verification according to claim 1, wherein
the total over-limit correction amount is decomposed as follows: safety constraint conditions of equipments at different voltage levels are verified layer by layer in priority order from low voltage levels to high voltage levels, with successive corrections, so that the total over-limit correction amount of each load point is obtained.

7. The distributed photovoltaic regulation method considering safety verification according to claim 1, wherein
in each command cycle, the respective initial regulation requirement of each automatic power generation control unit is corrected according to a respective regulation step size, a respective capacity constraint, and the respective maximum regulation amount of each automatic power generation control unit.

8. The distributed photovoltaic regulation method considering safety verification according to claim 1, wherein
when a total regulation requirement of an automatic power generation control region is in a same direction as an over-limit correction amount, an absolute value of the respective regulation requirement of each automatic power generation control unit is a maximum of an absolute value of an initial regulation requirement obtained by decomposition according to a set strategy and an absolute value of the respective over-limit correction amount of each automatic power generation control unit, and a direction of the respective regulation requirement of each automatic power generation control unit is downward; or when a total regulation requirement of an automatic power generation control region is in an opposite direction to an over-limit correction amount, an automatic power generation control unit under a blocked equipment is executed according to an allocated over-limit correction amount, a downward regulation amount generated by the blocked equipment is inversely added to the total regulation requirement of the automatic power generation control region, and the total regulation requirement of the automatic power generation control region is decomposed according to an inter-group allocation strategy and an intra-group allocation strategy to obtain the respective regulation requirement of each automatic power generation control unit, wherein a control unit participating in over-limit correction does not participate in decomposition and allocation of a current round of district total regulation requirement.

9. A distributed photovoltaic regulation system considering safety verification, comprising:
a regulation safety verification module configured to acquire limit values of an power transmission and transformation equipment, load conditions, and distributed photovoltaic aggregation information under the equipment, calculate an load rate of the equipment, calculate a total maximum regulation amount of distributed photovoltaic power under the equipment or a total over-limit correction amount of distributed photovoltaic power under the equipment based on the load rate of the equipment and a threshold value, and decompose the total maximum regulation amount or the total over-limit correction amount to obtain a respective total maximum regulation amount of each load point or a respective total over-limit correction amount of each load point; and a distributed photovoltaic automatic power generation control module configured to decompose the respective total maximum regulation amount or the respective total over-limit correction amount of each load point to obtain a respective maximum regulation amount or a respective over-limit correction amount of each automatic power generation control unit, correct a respective regulation requirement of each automatic power generation control unit, generate a respective regulation target of each automatic power generation control unit, and send the respective regulation target to each automatic power generation control unit for execution, wherein the total maximum regulation amount of the distributed photovoltaic power under the equipment comprises a maximum total downward regulation amount of the distributed photovoltaic power under the equipment, and the maximum total downward regulation amount of the distributed photovoltaic power under the equipment satisfies $\Delta P_{lim,d}^{-}=(K_1-\lambda_d^{+})*S_{e,d}$ or $\Delta P_{lim,d}^{-}=0$, wherein $\Delta P_{lim,d}^{-}$ denotes a maximum total downward regulation amount of a distributed photovoltaic power under an equipment d, $\lambda_d^{+}$ denotes a forward load rate of the equipment d, and $S_{e,d}$ denotes an operating limit set for the equipment d;

wherein the total maximum regulation amount of the distributed photovoltaic power under the equipment comprises a maximum total absorption amount of the distributed photovoltaic power under the equipment, and the maximum total absorption amount of the distributed photovoltaic power under the equipment satisfies $\Delta P_{lim,d}^{+}=(K_2-\lambda_d^{-})*S_{e,d}$ or $\Delta P_{lim,d}^{+}=0$, wherein $\Delta P_{lim,d}^{+}$ denotes a maximum total absorption amount of a distributed photovoltaic power under an equipment d, $\lambda_d^{-}$ denotes a reverse load rate of the equipment d, and $K_1$ and $K_2$ are each a set threshold value;

wherein the total over-limit correction amount of the distributed photovoltaic power under the equipment satisfies $\Delta P_{crr,d}=(1-\delta\%-\lambda_d^{-})*S_{e,d}$, wherein $\Delta P_{crr,d}$ denotes an over-limit correction amount of an equipment d, and $\delta$ denotes a reserved safety margin;

wherein the total maximum regulation amount or the total over-limit correction amount is decomposed according to negative sensitivity of active power injection of an equipment to load points;

wherein the respective total maximum regulation amount of each load point is decomposed in different manners depending on an allocation strategy in a distributed photovoltaic automatic power generation control group; and in response to the allocation strategy in the distributed photovoltaic automatic power generation control group being a priority allocation strategy, then in each round, based on a respective initial regulation requirement of each automatic power generation control unit under each load point, a total regulation requirement of automatic power generation control units under each load point is calculated and is verified to exceed the respective total maximum regulation amount of each load point or not; and when an initial regulation requirement is allocated to an automatic power generation control unit so that a total regulation requirement of a load point to which the automatic power generation control unit is connected exceeds the total maximum regulation amount, then no regulation requirement is allocated to the automatic power generation control unit, until the total regulation requirement of the automatic power generation control units under each load point is completely allocated; or in response to the allocation strategy in the distributed photovoltaic automatic power generation control group being an installed-capacity-based proportional allocation strategy, then the respective total maximum regulation amount of each load point is allocated to automatic power generation control units under each load point according to installed capacity proportions; and wherein the respective total over-limit correction amount of each load point is decomposed to a respective automatic power generation control unit under each load point in a same manner and in accordance with an intra-group allocation strategy to serve as a downward regulation amount of the respective automatic power generation control unit, wherein the intra-group allocation strategy is selected by distributed photovoltaic automatic power generation control.

10. The distributed photovoltaic regulation system considering safety verification according to claim 9, further comprising a resource aggregation module, wherein the resource aggregation module is configured to aggregate low-voltage distributed photovoltaic information to a load point of a main grid according to a model affiliation relationship to obtain low-voltage distributed photovoltaic aggregation information of the load point of the main grid and then aggregate the low-voltage distributed photovoltaic aggregation information of the load point of the main grid to each equipment of the main grid through a topology analysis to obtain respective distributed photovoltaic aggregation information under the equipment of each equipment of the main grid.

11. The distributed photovoltaic regulation system considering safety verification according to claim 9, wherein
when an equipment forward load rate is less than a set threshold value K1, the maximum total downward regulation amount of the distributed photovoltaic power under the equipment satisfies $\Delta P_{lim,d}^{-}=(K_1-\lambda_d^{+})*S_{e,d}$; or
when an equipment forward load rate is greater than a set threshold value K1, the maximum total downward regulation amount of the distributed photovoltaic power under the equipment satisfies $\Delta P_{lim,d}^{-}=0$.

12. The distributed photovoltaic regulation system considering safety verification according to claim 9, wherein
when an equipment reverse load rate is greater than 0 and less than a set threshold value K2, the maximum total absorption amount of the distributed photovoltaic power under the equipment satisfies $\Delta P_{lim,d}^{+}=(K_2-\lambda_d^{-})*S_{e,d}$; or when an equipment reverse load rate is greater than a set threshold value K2, the maximum total absorption amount of the distributed photovoltaic power under the equipment satisfies $\Delta P_{lim,d}^{+}=0$.

13. The distributed photovoltaic regulation system considering safety verification according to claim 9, wherein
the total maximum regulation amount is decomposed as follows: safety constraint conditions of equipments at different voltage levels are verified layer by layer in priority order from low voltage levels to high voltage levels, with successive corrections, so that the total maximum regulation amount of each load point is obtained.

14. The distributed photovoltaic regulation system considering safety verification according to claim 9, wherein
the total over-limit correction amount is decomposed as follows: safety constraint conditions of equipments at different voltage levels are verified layer by layer in priority order from low voltage levels to high voltage levels, with successive corrections, so that the total over-limit correction amount of each load point is obtained.

15. The distributed photovoltaic regulation system considering safety verification according to claim 9, wherein
in each command cycle, the respective initial regulation requirement of each automatic power generation control unit is corrected according to a respective regulation step size, a respective capacity constraint, and the respective maximum regulation amount of each automatic power generation control unit.

16. The distributed photovoltaic regulation system considering safety verification according to claim 9, wherein
when a total regulation requirement of an automatic power generation control region is in a same direction as an over-limit correction amount, an absolute value of the respective regulation requirement of each automatic power generation control unit is a maximum of an absolute value of an initial regulation requirement obtained by decomposition according to a set strategy and an absolute value of the respective over-limit correction amount of each automatic power generation control unit, and a direction of the respective regulation requirement of each automatic power generation control unit is downward; or
when a total regulation requirement of an automatic power generation control region is in an opposite direction to an over-limit correction amount, an automatic power generation control unit under a blocked equipment is executed according to an allocated over-limit correction amount, a downward regulation amount generated by the blocked equipment is inversely added to the total regulation requirement of the automatic power generation control region, and the total regulation requirement of the automatic power generation control region is decomposed according to an inter-group allocation strategy and an intra-group allocation strategy to obtain the respective regulation requirement of each automatic power generation control unit, wherein a control unit participating in over-limit correction does not participate in decomposition and allocation of a current round of district total regulation requirement.

* * * * *